United States Patent Office 3,448,155
Patented June 3, 1969

3,448,155
PROCESS FOR THE HYDROLYSIS OF 7,7-DIHALO-BICYCLO - [3.2.0] - 2 - HEPTENE - 6 - ONES TO TROPOLONES
Paul D. Bartlett, Weston, Mass., assignor to PPG Industries, Inc., a corporation of Pennsylvania
No Drawing. Filed Apr. 5, 1965, Ser. No. 445,761
Int. Cl. C07c 49/60
U.S. Cl. 260—586
10 Claims

ABSTRACT OF THE DISCLOSURE

Tropolone and substituted tropolones are provided by aqueous liquid phase hydrolysis of α,α-dihalobicycloheptenones.

---

This invention relates to the preparation of tropolone and substituted tropolones and more particularly to their preparation from α,α-dihalobicycloheptenones.

Many naturally occurring tropolones have demonstrated valuable pesticidal properties. For example, plants containing tropolones have shown fungistatic and fungicidal properties. Tropolone compounds also have bacteriostatic and bacteriocidal activity. Further studies have given attention to tropolones for their effect on the respiratory and circulatory system and on muscles and nerves of organisms. Hinokitiol or β-Thujaplicin (4-isopropyltropolone), α-Thujaplicin (3-isopropyltropolone), and γ-Thujaplicin (5-isopropyltropolone) have demonstrated their activity on organisms as naturally occurring substances. Nootkatin [4-isopropyl-5-(γ-methylcrotyl) - tropolone] has demonstrated fungistatic and fungicidal properties. Naturally occurring bromoamino tropolones are also active compounds.

Pursuant to this invention, 7-membered ring compounds typified by tropolone (2-hydroxy-2,4,6-cycloheptatriene-1-one) are provided by a new synthetic route which offers benefits such as ease of execution by comparison with heretofore proposed syntheses.

In accordance herewith, it has been discovered that α,α-dihalobicycloheptenones can be converted to tropolones. Thus, in the present invention, α,α-dihalobicycloheptenones, in particular, 7,7-dihalobicyclo-[3.2.0]-2-hepten-6-ones (otherwise referred to as 5,5-dihalobicyclo-[3.2.0]-2-hepten-6-ones), are converted in liquid medium containing water and a basic compound to tropolones, the following equation presumably representing the reaction whereby these conversions are performed:

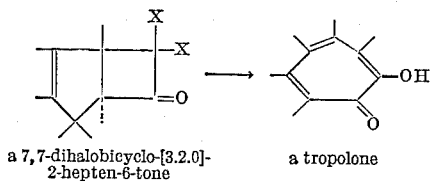

a 7,7-dihalobicyclo-[3.2.0]-
2-hepten-6-tone a tropolone wherein X is a halogen atom, notably chlorine.

The α,α-dihalobicycloheptenones from which tropolones are formed pursuant to this invention are produced by the reaction of a dihaloketene with a cyclopentadiene. Thus, a dihaloketene such as dichloroketene is formed by contacting a dihaloacetyl halide with tertiary amine in inert, nonaqueous liquid medium and is reacted "in situ" with a cyclopentadiene which is incorporated in the liquid medium. U.S. patent application Ser. No. 221,337 filed Sept. 4, 1962, now abandoned, assigned to the assignee of this application describes in further detail the preferred conditions for preparing the α,α-dihalobicycloheptenones. The α,α-dihalobicycloheptenones are thus 1:1 adducts of a dihaloketene and a cyclopentadiene.

Numerous α,α-dihalobicycloheptenone adducts may be hydrolyzed or converted to a tropolone so long as they contain at least one available hydrogen atom. Generally, this available hydrogen atom is linked to the methylene carbon atom adjacent to the carbonyl oxygen; however, it may be linked to any of the ring carbon atoms. In one particular embodiment hereof, the available hydrogen atom is bonded to a carbon of an alkylidene substituent. When a substituted α,α-dihalocycloheptenone is used, it is generally preferred that each substituent contain from 1 to 6 carbon atoms. However, when an aryl group is linked to the ring, it also may contain short chain substituents so that the total number of carbon atoms present may exceed 6 for that particular substituent. It is rare for any substituent to contain more than 10 carbon atoms. Further, if a plurality of substituents on the bicyclo adducts are employed, they are usually all short chain substituents such as a dimethyl substituted α,α-dihalobicycloheptenone, although long and short chain substituents may be employed together such as a methyl-pentene or a methyl-benzo substituted α,α-dihalobicycloheptenone.

Substituted α,α-dihalobicycloheptenones may be provided by employing common substituent groups including alkyl such as methyl, propyl, pentyl; substituted alkyl such as chloroalkyl, bromoalkyl; alkenyl such as vinyl, propenyl; alkylidene such as methylene, ethylidene, propylidene, hexylidene; aryl such as phenyl, benzyl, tolyl, benzo; substituted aryl such as haloaryl, methoxyphenyl; halo; amino; or other groups which are inert to the addition and hydrolysis processes. Certain of these groups may be present in combination to provide mixed substituents such as bromo-amino and chloro-alkyl substituted α,α-dihalobicycloheptenones. Among these α,α-dihalobicycloheptenones so provided which are especially useful are the alkyl substituted, notably the methyl and isopropyl substituted, α,α-dihalobicycloheptenones. These compounds, in turn, provide methyl and isoprpoyl substituted tropolones. By way of example, 4- and 6-isopropyltropolones (4- and 6 isopropyl-2-hydroxy-2,4,6-cycloheptatriene-1-ones) are provided from either 4-isopropyl-7,7-dihalobicyclo-[3.2.0]-2-hepten-6-one or 2-isopropyl-7,7-dihalobicyclo-[3.2.0]-2-hepten-6-one. Benzo substituted tropolone is provided from 2,3-benzo-7,7-dihalobicyclo-[3.2.0]-2-hepten-6-one which may be typified as the 1:1 molar adduct of a dihaloketene and indene.

The hydrolysis of the α,α-dihalobicycloheptenone adducts to tropolones is advantageously carried out in liquid medium. Such liquid medium may comprise a dilute aqueous solution of basic compound with a separate organic phase containing the α,α-dihalobicycloheptenone or it may comprise a dilute aqueous solution of basic compound with an inert, water soluble solvent for the α,α-dihalobicycloheptenone. The dilute aqueous solution of basic compound herein contemplated is provided by admixing water and a basic alkali or alkaline earth metal compound such as an alkali or alkaline earth metal hydroxide, oxide, bicarbonate, carbonate, and hydride. Inert, water soluble solvent for the α,α-dihalobicycloheptenone reactant is provided by an organic alcohol such as tertiary-butanol or other water soluble organic solvents such as dioxane and diethylformamide. The liquid medium may also be provided by organic solvent plus a basic compound such as dimethylformamide plus alkali metal hydroxide, dimethylsulfoxide plus alkali metal hydride, tetrahydrofuran plus potassium tertiary butoxide, and dioxane plus alkaline earth oxide. In this embodiment, the necessary water requirement may be satisfied by adding water near reaction completion to produce the hydrolyzed product before recovery from the reaction medium. An aqueous alkali metal acetate-acetic acid liquid medium derived from a basic alkali metal compound and excess glacial acetic acid is particularly suitable in the hydrolysis reaction. By way of illustration and not by way of limitation, potassium hydroxide may be admixed with excess glacial acetic acid to form the liquid medium. The potassium hydroxide reacts with the acetic acid forming potassium acetate and water.

Water is necessary to the hydrolysis reaction. It may be added to the reaction at various stages of completion but, in the preferred embodiments, is formed "in situ" as described above. In those systems in which aqueous medium containing basic compound is not employed, the water is best added near completion end as mentioned hereinbefore. Best results occur with water present in excess to the amount of $\alpha,\alpha$-dihalobicycloheptenone to be converted or hydrolyzed to a tropolone product; however, a broad range may be employed. Thus, proportions of from about 0.9 mole to about 10.0 moles water per mole of $\alpha,\alpha$-dihalobicycloheptenone reactant are satisfactory. Greater amounts of water, in excess of 10 moles water per mole of $\alpha,\alpha$-dihalobicycloheptenone present, do not hinder the reaction. Where solvent is not employed for the $\alpha,\alpha$-dihalobicycloheptenone, water is best added in greater excess or well over 10 moles of water per mole of $\alpha,\alpha$-dihalobicycloheptenone.

The basic compound utilized in the liquid medium is preferably present in about double molar quantities as the $\alpha,\alpha$-dihalobicycloheptenone reactant. At least two moles of basic compound per mole of $\alpha,\alpha$-dihalobicycloheptenone present is required for the conversion to the tropolone product as well as for the consumption of hydrogen halide liberated by the process. Less than double molar quantities may result in incomplete reaction. Greater amounts are generally unnecessary; however, a slight excess is desirable to insure complete conversion to the tropolone product. Hence, the generally preferred concentration range is from 0.9 mole to about 10 moles and, more particularly, about 5.0 moles basic compound per mole of $\alpha,\alpha$-dihalobicycloheptenone reactant.

The conversion or hydrolysis reaction is usually carried out in an excess of liquid medium basis the amount of $\alpha,\alpha$-dihalobicycloheptenone adduct to be converted. In the embodiment in which the dilute aqueous solution of basic compound is utilized with a separate organic phase containing the $\alpha,\alpha$-dihalobicycloheptenone, water is generally present in great excess or substantially more than 10 moles of water per mole of $\alpha,\alpha$-dihalobicycloheptenone as mentioned hereinbefore. In the alternate embodiment in which organic solvent either with or without the presence of an aqueous solution is utilized for the $\alpha,\alpha$-dihalobicycloheptenone, an amount of solvent is chosen which provides sufficient solubility for the reactants whereby to establish and maintain a liquid phase reaction. Often, optimum results are realized when as much as a 50 fold excess of solvent is employed basis the amount of $\alpha,\alpha$-dihalobicycloheptenone present; however, the amount of solvent used may be varied considerably. Thus, in the preferred system which employs an aqueous alkali metal acetate-acetic acid liquid medium, acetic acid is commonly added in amounts as great as 50 moles acetic acid per mole of $\alpha,\alpha$-dihalobicycloheptenone but amounts as low as about 5 or 10 moles acetic acid per mole of $\alpha,\alpha$-dihalobicycloheptenone are effective.

Considerable latitude in the concentrations of the components of the process is thus evident. This is also true for the conditions of pressure, temperature, and time. The hydrolysis commonly operates under atmospheric pressure; however, slight deviations from atmospheric pressure are possible where desired.

The temperatures employed may vary depending upon the particular liquid medium employed and also upon the pressure should pressures other than atmospheric be employed. Moderate temperatures, generally about at reflux under atmospheric pressure, are satisfactory. However, very low temperatures are useful where the basic compound supplied by the liquid medium is extremely active. By way of example, temperatures of about $-80°$ C. are effective where potassium tertiary-butoxide is utilized in the liquid medium. Naturally, for such low temperatures to be employed, a special reaction medium which is liquid at the low temperature is selected. Generally, however, reflux temperatures under atmospheric pressure for that particular reaction medium employed are preferable.

Generally, the conversion to tropolones will have proceeded to a significant extent within four hours. Considerably shorter reaction times, i.e. several minutes, are appropriate in those systems where an extremely active reactant is present. Longer contact times such as 24 hours are operative. Most desirable results may be achieved with reaction times of from 15 minutes to about 12 hours.

The tropolone product is commonly and advantageously recovered from the reaction through a copper complex. In this embodiment, the complex is used to isolate the tropolone product and serves as a means of proper identification as well. Thus, upon reaction completion the mixture containing product is shaken with a solution of a copper salt such as cupric acetate and cupric sulfate to form a copper-tropolone complex thereby. This complex is readily separated from the reaction residue and recovered. Its melting point and other physical characteristics may be used to provide positive identification of the correct complex formation. Subsequently, the complex, dissolved in a solvent such as chloroform, may be saturated with hydrogen sulfide. Black cupric sulfide is formed and easily removed leaving a nearly colorless solution from which the pure tropolone product may be isolated upon solvent removal. Hence, the tropolone product is thereby very easily recovered.

The following examples illustrate the manner in which the present invention may be practiced.

EXAMPLE I

A solution containing 1.0 mole, 147.5 grams, of dichloroacetyl chloride and freshly distilled cyclopentadiene, 9.76 moles, 645.0 grams, in n-hexane, 491.0 grams, was cooled to $-20°$ C. To this solution was added at a constant rate over about 2.5 hours a second solution which contained 1.0 mole, 101.0 grams, of triethylamine in 489.0 grams of n-hexane. The reaction mixture, at 5.0° C., was stirred for one hour after addition was complete and then allowed to stand overnight at room temperature. After work-up, an amount corresponding to a yield of 75 percent by weight of the theoretical quantity of a product consisting predominantly of 7,7-dichlorobicyclo-[3.2.0]-2-hepten-6-one was recovered.

EXAMPLE II

To a solution of 300 milliliters of glacial acetic acid containing 25 grams, 0.45 mole, of potassium hydroxide was added 0.1 mole, 17.8 grams, of the product obtained by the procedure of Example I. The mixture was heated under reflux at 110° C. to 120° C. overnight. After the reaction was complete, the acetic acid was removed under reduced pressure and the resulting oily residue was purified by methylene chloride extraction of discardable material and was dissolved in benzene. Crystallization at 0° C. produced a colorless needle-like solid with a melting point of 49° C. to 51° C. Concentration of the mother liquor followed by shaking the residue with an aqueous cupric acetate solution gave a green needle-like solid representing the copper-tropolone complex, melting point 315° C. This complex was dissolved in 50 ml. of chloroform and, while stirring, the resulting solution was saturated with hydrogen sulfide. The black cupric sulfide was removed leaving a colorless solution. Upon the removal of solvent from this solution, additional colorless needle-like solid which melted at from 49° C. to 51° C. was recovered. The total yield of tropolone was 3.73 grams and it was positively identified by its melting point and the melting point of its copper complex as well as infrared data showing hydroxyl absorption at 3100 centimeters$^{-1}$ and strong carbonyl-hydrogen bonding absorption at 1610 centimeters$^{-1}$.

EXAMPLE III

The procedure of Example II was followed except that 2.0 grams, 0.011 mole, of the dichloroketene-cyclopentadiene adduct was added to 35 milliliters of a 1-normal aqueous sodium bicarbonate solution. The mixture was stirred for 2 hours at room temperature and thereafter raised to 75° C. for 5 hours. Tropolone in the form of precipitated white needles was recovered with a melting point of 49° C. to 50° C. An infrared spectrum taken of the precipitate was identical to the published spectrum of tropolone.

EXAMPLE IV

The procedure of Example II is followed except that 8.9 grams, 0.05 mole, of the adduct prepared as in Example I is added to a solution comprised of 25 milliliters of t-butyl alcohol and 4 grams of potassium hydroxide. Two milliliters of water is added. The mixture is refluxed for 2 hours after which white needles are recovered.

Calc'd for $C_7H_6O_2$: C, 68.84; H, 4.95. Found: C, 68.41, 68.29; H, 4.65, 4.65.

EXAMPLE V

The procedure of Example II is followed with a number of substituted α,α-dihalobicycloheptenones to give their corresponding substituted tropolones. The results are given in Table I.

Table I

Substituent on 7,7-dihalobicyclo-[3.2.0]-2-hepten-6-one adduct:
    4-methyl
    3-methyl
    2-methyl
    1-methyl
    3-ethyl
    4-isopropyl
    3-isopropyl
    2-isopropyl
    isopropylidene
    2,3-benzo (from indene)
    4-phenyl
    3-p-methoxyphenyl
    2-bromo
    2-chloro-3-isopropyl
    2-nitro Substituent on resultant tropolone:
    4- and 6-methyl.
    5-methyl.
    4-methyl and 6-methyl.
    3-methyl and 7-methyl.
    5-ethyl.
    4- and 6-isopropyl.
    5-isopropyl.
    4-isopropyl and 6-isopropyl.
    isopropenyl.
    4,5-benzo and 5,6-benzo.
    4- and 6-phenyl.
    5-p-methoxyphenyl.
    4-bromo and 6-bromo.
    4-chloro-5-isopropyl and 6-chloro-5-isopropyl.
    4-nitro and 6-nitro.

Alternatively, the α,α-dihalobicycloheptenone adducts contemplated herein may be subjected to a vapor phase dehydrohalogenation over a dehydrohalogenation catalyst to result in the corresponding halotropone which may be subsequently hydrolyzed to a tropolone in aqueous medium. The initial vapor phase conversion to the halotropone may require temperatures as high as about 350° C.

I claim:
1. A process for the preparation of a tropolone which comprises hydrolyzing an α,α-dichlorobicyclo-[3.2.0]-heptenone having an available hydrogen atom linked to a ring carbon atom in a liquid medium of an aqueous solution of a basic compound.

2. A process for the preparation of a tropolone which comprises hydrolyzing a 7,7-dichlorobicyclo-[3.2.0]-2-hepten-6-one having an available hydrogen atom linked to a ring carbon atom in a liquid medium of an aqueous solution of a basic compound.

3. The process according to claim 1 wherein said liquid medium comprises a dilute aqueous solution of a basic compound selected from the group consisting of alkali metal compound and alkaline earth metal compond.

4. The process according to claim 2 wherein said liquid medium comprises a dilute aqueous solution of a basic compound selected from the group consisting of alkali metal compound and alkaline earth metal compound.

5. The process of claim 1 wherein the hydrolysis is conducted by contacting the α,α-dichlorobicyclo-[3.2.0]-heptenone with a liquid medium containing an aqueous alkali metal acetate and acetic acid maintained at a temperature up to about the reflux temperature of the liquid medium.

6. The method of claim 1 wherein the α,α-dichlorobicyclo-[3.2.0]-heptenone is a substituted [3.2.0] heptenone containing at least one substituent having up to 10 carbon atoms selected from the group consisting of aryl and alkyl groups.

7. The process of claim 2 wherein the hydrolysis is conducted in an aqueous alkali metal acetate-acetic acid liquid medium at a temperature up to about reflux temperature of the liquid medium.

8. A process for the preparation of tropolone by hydrolysis of 7,7 - dichlorobicyclo-[3.2.0]-2-hepten-6-one which comprises contacting said compound with an aqueous solution of a basic compound.

9. The method of claim 8 wherein the hydrolysis is conducted in a liquid phase provided by an aqueous alkali metal acetate-acetic acid liquid medium maintained at a temperature up to the reflux temperature of the liquid medium.

10. The method of claim 9 wherein the liquid medium contains from 5 to 50 moles of acetic acid and in excess of 10 moles of water per mole of the 7,7-dichlorobicyclohepten-6-one.

References Cited

Drysdale et al., "J. Am. Chem. Soc." vol. 80, pp. 245 to 246 (1958).

Dryden et al., "J. Am. Chem. Soc." vol. 77, pp. 5633 to 5637 (1955).

Stevens et al., "J. Am. Chem. Soc." vol. 87, pp. 5257 to 5259 (1965).

LEON ZITVER, *Primary Examiner.*

M. M. JACOB, *Assistant Examiner.*

U.S. Cl. X.R.
260—563, 590